(12) United States Patent
Wenger et al.

(10) Patent No.: US 9,124,677 B2
(45) Date of Patent: Sep. 1, 2015

(54) SYSTEMS INVOLVING PORTABLE ELECTRONIC DEVICES AND RELATED METHODS

(71) Applicant: HTC Corporation, Taoyuan, Taoyuan County (TW)

(72) Inventors: Scott Paul Wenger, Raleigh, NC (US); Rodney Owen Williams, Cary, NC (US)

(73) Assignee: HTC CORPORATION, New Taipei (TW)

( * ) Notice: Subject to any disclaimer, the term of this patent is extended or adjusted under 35 U.S.C. 154(b) by 222 days.

(21) Appl. No.: 13/684,261

(22) Filed: Nov. 23, 2012

(65) Prior Publication Data

US 2014/0148223 A1    May 29, 2014

(51) Int. Cl.
*H04B 1/38* (2015.01)
*H04M 1/02* (2006.01)
*H04M 1/725* (2006.01)

(52) U.S. Cl.
CPC ........ *H04M 1/0254* (2013.01); *H04M 1/72575* (2013.01); *H04M 2250/04* (2013.01)

(58) Field of Classification Search
CPC ..... H04W 88/02; H04M 1/0214; H01Q 1/243
USPC .......... 455/557, 575.7, 575.1, 575.8
See application file for complete search history.

(56) References Cited

U.S. PATENT DOCUMENTS

| | | | |
|---|---|---|---|
| 5,959,583 A * | 9/1999 | Funk | 343/702 |
| 8,825,124 B1 * | 9/2014 | Davies et al. | 455/575.8 |
| 2006/0160487 A1 | 7/2006 | Nam et al. | |
| 2009/0181735 A1 | 7/2009 | Griffin, Jr. et al. | |

FOREIGN PATENT DOCUMENTS

| | | |
|---|---|---|
| CN | 1808921 | 7/2006 |
| JP | 2005160022 A | 6/2005 |

* cited by examiner

*Primary Examiner* — Chuck Huynh
(74) *Attorney, Agent, or Firm* — McClure, Qualey & Rodack, LLP

(57) ABSTRACT

Systems involving portable electronic devices and related methods are provided. In this regard, a representative system includes: an accessory having an antenna and a device interface, the device interface electrically communicating with the antenna; the accessory being movable between an attached configuration, in which the accessory engages the portable electronic device such that the device interface communicates signals between the portable electronic device and the antenna, and a detached configuration, in which the accessory is disengaged from the portable electronic device.

16 Claims, 4 Drawing Sheets

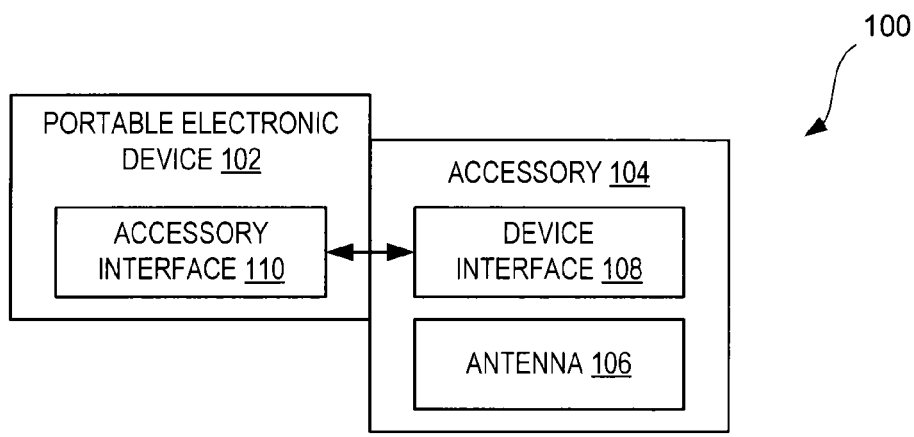
FIG. 1
CONFIGURE AN ACCESSORY TO PROVIDE AN EXTERNAL ANTENNA FOR A PORTABLE ELECTRONIC DEVICE
120
FIG. 2
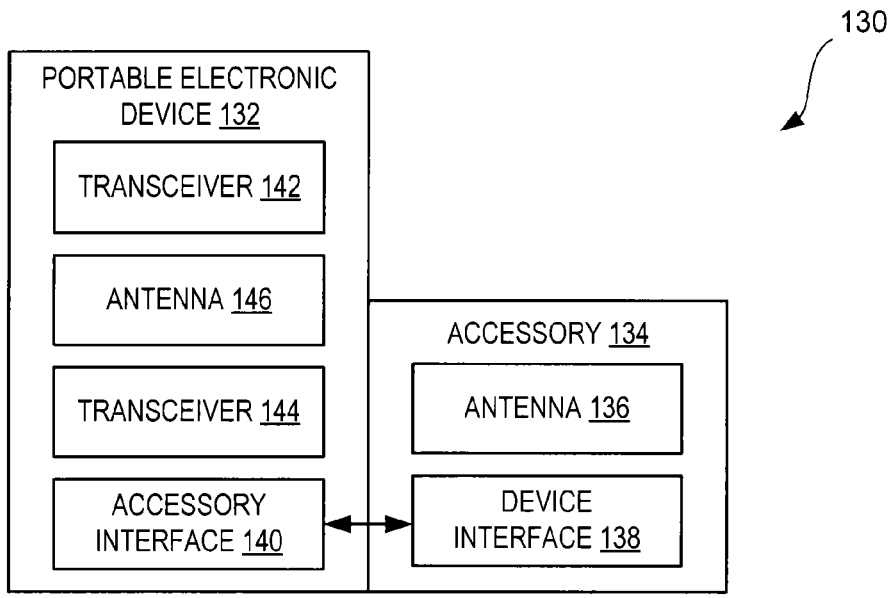
FIG. 3

SYSTEMS INVOLVING PORTABLE ELECTRONIC DEVICES AND RELATED METHODS

TECHNICAL FIELD

The present disclosure generally relates to portable electronic devices.

BACKGROUND

Portable electronic devices (e.g., mobile phones and tablet computers) are generally burdened by multiple antennas that often compete for radiating volume and performance envelope. In some instances, a subset of customers of such devices may desire additional features. However, a manufacturer of such a device may not wish to burden the device with these additional features due to inherent design considerations.

SUMMARY

Systems involving portable electronic devices and related methods are provided. Briefly described, one embodiment, among others, is a system involving a portable electronic device comprising: an accessory having an antenna and a device interface, the device interface electrically communicating with the antenna; the accessory being movable between an attached configuration, in which the accessory engages the portable electronic device such that the device interface communicates signals between the portable electronic device and the antenna, and a detached configuration, in which the accessory is disengaged from the portable electronic device.

Another embodiment is a system comprising: a portable electronic device having an accessory interface; and an accessory having an antenna and a device interface, the device interface electrically communicating with the antenna; the accessory being movable between an attached configuration, in which the accessory interface at least electrically communicates with the device interface such that the antenna communicates signals for the portable electronic device, and a detached configuration, in which the accessory is disengaged from the portable electronic device.

Another embodiment is a method involving a portable electronic device comprising: configuring an accessory to provide an external antenna for a portable electronic device.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is a schematic diagram of an example embodiment of a system involving a portable electronic device.

FIG. 2 is a flowchart depicting an example embodiment of a method involving a portable electronic device.

FIG. 3 is a schematic diagram of another example embodiment of a system involving a portable electronic device.

DETAILED DESCRIPTION

Figure 4:
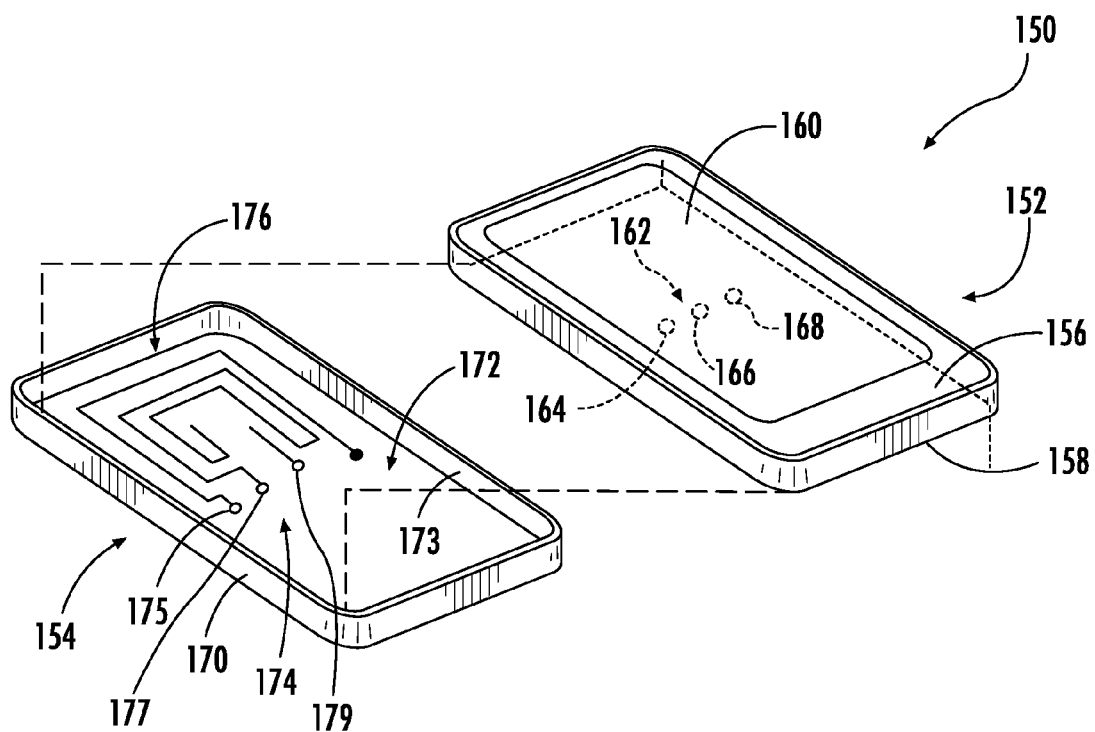
FIG. 4 is a schematic diagram of an example embodiment of a system in which the portable electronic device and the accessory are in a detached configuration.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, systems involving portable electronic devices and related methods are provided. In some embodiments, a portable electronic device (e.g., a mobile phone or tablet computer) is implemented with functionality for using an antenna; however, such an antenna is not implemented by the portable electronic device. Instead, an accessory is provided that incorporates an antenna, with the device and the accessory being configured to communicate with each other so that the device may make use of the antenna of the accessory. In some embodiments, the antenna may be configured for facilitating near field communications (NFC).

FIG. 1 is a schematic diagram of an example embodiment of a system involving a portable electronic device. As shown in FIG. 1, system 100 includes a portable electronic device 102 and an accessory 104. Accessory 104 incorporates an antenna 106 and a device interface 108, which facilitates communication between device 102 and the antenna.

Device 102 incorporates an accessory interface 110, which is configured to at least electrically communicate with the device interface 108 when the device 102 and accessory 104 are in an attached configuration (depicted in FIG. 1). Notably, when in the attached configuration, the device 102 is able to use the antenna 106 of the accessory 104 for transmission and/or reception of signals.

FIG. 2 is a flowchart depicting an example embodiment of a method involving a portable electronic device. As shown in FIG. 2, the method involves configuring an accessory to provide an external antenna for a portable electronic device (block 120).

FIG. 3 is a schematic diagram of another example embodiment of a system. As shown in FIG. 3, system 130 includes a portable electronic device 132 and an accessory 134. Accessory 134 incorporates an antenna 136 and a device interface 138, which facilitates communication between device 132 and the antenna 136. An accessory interface 140 of device 132 is configured to at least electrically communicate with the device interface 138 when the device 132 and accessory 134 are in an attached configuration (depicted in FIG. 3).

Device 132 also incorporates transceivers 142, 144 and an antenna 146. Antenna 146 facilitates communications associated with transceiver 142. In this embodiment, device 132 does not include an onboard antenna for facilitating communications corresponding to transceiver 144. However, transceiver 144 is able to use antenna 136 of the accessory 134 when in the attached configuration.

FIG. 4 is a schematic diagram of another example embodiment of a system. As shown in FIG. 4, system 150 includes a portable electronic device 152, which is configured as a mobile phone (e.g., a smartphone), and an accessory 154, which is configured as a protective case for device 152.

Device 152 incorporates a front 156 and an opposing back 158. A display 160 (e.g., a touchscreen display) is positioned at the front. An accessory interface 162 is positioned at the back that is operative to at least electrically communicate with a device interface 174 of the accessory 154. In this embodiment, the accessory interface 162 includes conductive pads (or pins) 164, 166, 168, although in other embodiments various other numbers and configurations of interface components may be used.

Accessory 154 includes a housing 170 that defines a cavity 172. In this embodiment, the cavity 172 is bounded by a peripheral sidewall 173. The cavity 172 is sized and shaped so that, in the attached configuration, device 152 is received at least partially within the cavity 172. For instance, in this embodiment, the entire back of the portable electronic device 152 is positioned within the cavity 172 in the attached configuration. Notably, a device interface 174 associated with an antenna 176 (e.g., a near field communication (NFC) antenna) of the accessory 154 is positioned within the cavity 172.

Figure 5:
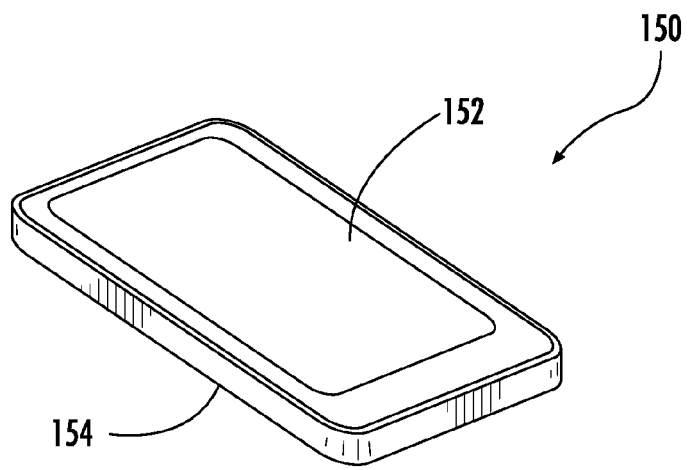
FIG. 5 is a schematic diagram of the embodiment of FIG. 4, with the portable electronic device and the accessory being in an attached configuration.

Accessory 154 is movable between a detached configuration (FIG. 4), in which the accessory 154 is disengaged from device 152, and an attached configuration named antenna mode (FIG. 5), in which accessory interface 162 electrically communicates with device interface 174, which includes conductive pads 175, 177, 179 that are positioned to engage pins 164, 166, 168, respectively. As such, the housing functions as an alignment mechanism to ensure that accessory interface 162 connects with device interface 174 for facilitating communications with antenna 176, thereby enabling the antenna 176 to propagate signals for device 152.

In this embodiment, pins 164, 166, 168 of accessory interface 162 are used to provide the necessary feedpoint and ground reference connections for antenna 176. For example, a primary ground reference may be provided on pin 164, while one or more of pins 166, 168 may provide contacts for a balanced transmission line to feed a loop antenna, or single or dual antenna feed contacts for PIFA, single monopole, dual monopole, or other type of radiating structure useful for implementing peripheral radios. In this case, an NFC transceiver (not shown) is embedded in device 152 along with the necessary front end and application processor interfaces (also not shown). It is noted that the front end and application processor interfaces generally do not represent the most significant burden on the device 152; rather, the most significant burden is generally derived from a large radiating element and its impact on industrial design (for example, the difficulty associated with metal housing structures covering a large element intended to radiate at low frequencies such as those needed for NFC at 13.56 MHz).

Figure 6:
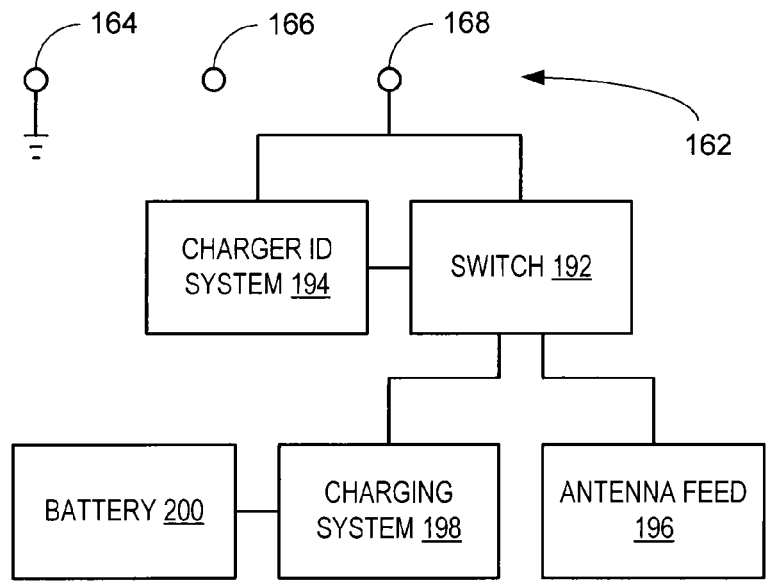
FIG. 6 is a block diagram of an embodiment of a control system implemented by a portable electronic device.

FIG. 6 is a block diagram of an embodiment of a control system implemented by device 152. As shown in FIG. 6, pins 164, 166, 168 are able to serve not only as connection for the antenna 176, but provide a direct charging connection, named charging mode, without burdening the device 152 with additional connectors. Specifically, pin 164 is defined as a reference ground for the antenna 176 as well as for a charger port. Pin 166 serves as a power connection (e.g., +5 VDC power connection) for use in conductive charging and may optionally play a role for interfacing with a peripheral antenna 176. Pin 168 serves as a single monopole antenna connection for NFC related accessories, but also serves as a charger identification pin for the conductive charging operations.

In order to achieve this multiplexed pin assignment, control system 190 incorporates an RF-capable switch 192, with switch logic being controlled via a charger ID system 194, which may perform automatic sensing of connected impedance (or other electrical parameter relative to ground). This detection algorithm could be triggered by the presence of a non-open resistance between the pin 168 and ground, with an intermittent test signal applied as a polling mechanism. In the event that impedance of the connection is in the vicinity of the peripheral antenna (for example, 50 ohms sensed upon introduction of a charge impulse), the switch would connect pin 168 to the antenna feed 196 (e.g., an NFC antenna front end). If higher impedance was detected (for example, 500 ohms or more relative to ground), the switch would connect the pin to a charging system 198 for charging a rechargeable battery 200 (i.e., charging input) of device 152.

Alternatively, charger ID system 194 may react to a rise in voltage introduced by the connection of a charging signal with sufficient speed as to disconnect the antenna circuitry from the charging voltage before a significant level is delivered to it. Other methods may involve AC coupled connections for the antenna interface and simultaneous DC coupled connections for the charging system path. Another variation of the concept is to provide a mechanism that would adaptively route the appropriate signals to the pins such that any orientation of connection results in a functionally correct connection.

Figure 7:
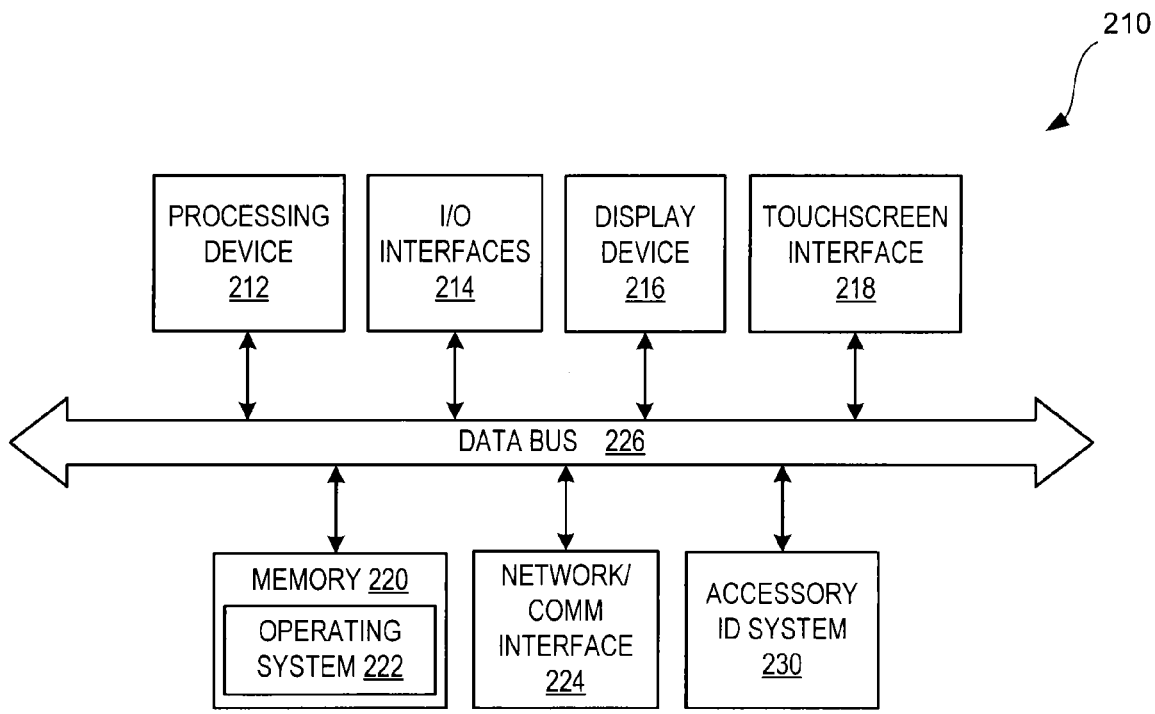
FIG. 7 is a schematic diagram of another example embodiment of a portable electronic device.

FIG. 7 is a schematic diagram of another example embodiment of a portable electronic device. As shown in FIG. 7, portable electronic device 210 includes a processing device (processor) 212, input/output interfaces 214, a display device 216, a touchscreen interface 218, a memory 220, operating system 222 and a network/communication interface 224, with each communicating across a local data bus 226. Additionally, the device incorporates an accessory ID system 230. It should be noted that one of the interfaces of I/O interfaces 214 includes an accessory interface (such as described before).

The processing device 212 may include a custom made or commercially available processor, a central processing unit (CPU) or an auxiliary processor among several processors, a semiconductor based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

The memory 220 may include any one or a combination of volatile memory elements (e.g., random-access memory (RAM, such as DRAM, and SRAM, etc.)) and nonvolatile memory elements. The memory typically comprises native operating system 222, one or more native applications, emulation systems, or emulated applications for any of a variety of operating systems and/or emulated hardware platforms, emulated operating systems, etc. For example, the applications may include application specific software which may comprise some or all the components of the system. In accordance with such embodiments, the components are stored in memory and executed by the processing device. Note that although depicted as not being resident in memory 220, charger ID system 194 and charging system 198 may be stored in memory 220.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

Touchscreen interface 218 is configured to detect contact within the display area of the display 216 and provides such functionality as on-screen buttons, menus, keyboards, softkeys, etc., that allows users to navigate user interfaces by touch.

With further reference to FIG. 7, network/communication interface 224 comprises various components used to transmit and/or receive data over a networked environment, such as transceiver 142 of FIG. 3. By way of example, such components may include a wireless communications interface. When such components are embodied as an application, the one or more components may be stored on a non-transitory computer-readable medium and executed by the processing device.

In operation, accessory ID system 230 determines whether an accessory is attached to the device 210. By way of example, the accessory ID system 230 may determine whether a battery charger or an external antenna is attached to the device. Responsive thereto, the accessory ID system 230 may route the corresponding signals to ensure appropriate functioning of the device is accomplished.

Figure 8:
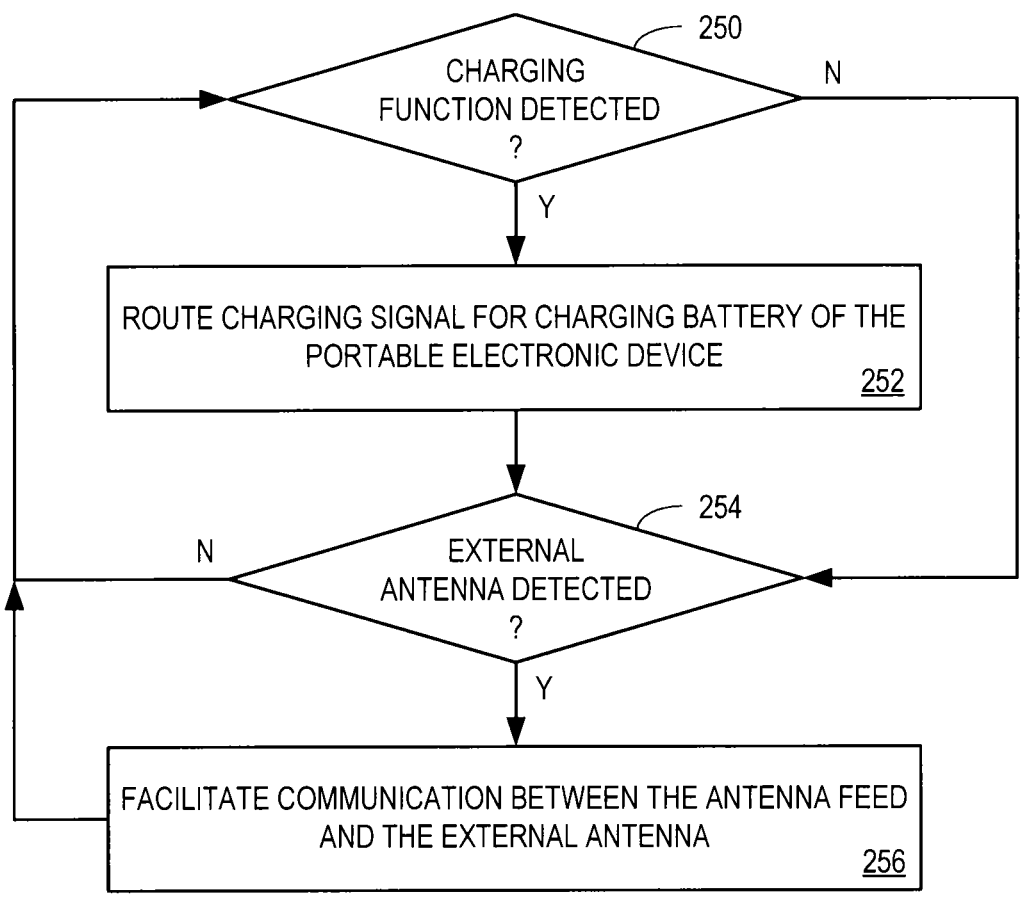
FIG. 8 is a flowchart depicting functionality that may be performed by an example embodiment of a portable electronic device.

In this regard, FIG. 8 is a flowchart depicting functionality that may be performed by an example embodiment of a portable electronic device, such as device 210. In particular, the functionality may be associated with accessory ID system 230. As shown in FIG. 8, the functionality (or method) may be construed as beginning at block 250, in which a determination is made as to whether a charging function is detected. In some embodiments, this may involve the detection of a charging signal from any charging device. If a charging function is detected, the process may proceed to block 252, in which a charging signal is routed for charging a battery of the portable electronic device.

If a charging function is not detected, the process may proceed to block 254, in which a determination is made as to whether an external antenna is detected (such as responsive to an accessory with an onboard antenna being attached to the portable electronic device). If such an antenna is detected, the process may proceed to block 256, in which communication between the antenna feed of the device and the external antenna is facilitated. However, if an external antenna is not detected, the process may return to block 250. Note that the process may also return to block 250 at an appropriate time following the use of the external antenna.

If embodied in software, it should be noted that each block depicted in the flowchart of FIG. 8 (or any of the other flowcharts) represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. By way of example, the systems described may be implemented in hardware, software or combinations thereof. All such modifications and variations are intended to be included herein within the scope of this disclosure and protected by the following claims.

At least the following is claimed:

1. A system involving a portable electronic device, the portable electronic device having an accessory interface, a first transceiver, a first antenna, and a second transceiver, the first antenna being operative to propagate signals associated with the first transceiver but lacking an antenna operative to propagate signals associated with the second transceiver, the system comprising:
    an accessory having an antenna and a device interface, the device interface electrically communicating with the antenna;
    the accessory being movable between an attached configuration, in which the accessory engages the portable electronic device such that the device interface communicates signals between the portable electronic device and the antenna and the antenna is operative to propagate signals associated with the second transceiver, and a detached configuration, in which the accessory is disengaged from the portable electronic device;
    wherein the accessory has a housing defining a cavity, and the cavity is sized and shaped such that, in the attached configuration, the portable electronic device is received at least partially within the cavity;
    wherein the accessory is a protective case for the portable electronic device.

2. The system of claim 1, wherein the device interface is positioned within the cavity.

3. The system of claim 1, wherein:
    the portable electronic device has a front, a back and a display, the display being positioned at the front of the portable electronic device; and
    the cavity is sized and shaped such that, in the attached configuration, the back of the portable electronic device is positioned within the cavity.

4. The system of claim 1, wherein the antenna is a near field communication (NFC) antenna.

5. The system of claim 1, further comprising the portable electronic device.

6. The system of claim 5, wherein the portable electronic device is configured as a mobile phone.

7. The system of claim 5, wherein the portable electronic device has an accessory interface operative to at least electrically communicate with the device interface of the accessory.

8. The system of claim 7, wherein:
    the portable electronic device further comprises a battery charging system; and
    the portable electronic device is operative to energize the battery charging system responsive to a charging input being received at the accessory interface.

9. A system comprising:
    a portable electronic device having an accessory interface, a first transceiver, a first antenna, and a second transceiver, the first antenna being operative to propagate signals associated with the first transceiver but lacking an antenna operative to propagate signals associated with the second transceiver; and an accessory having an antenna and a device interface, the device interface electrically communicating with the antenna;

the accessory being movable between an attached configuration, in which the accessory interface at least electrically communicates with the device interface such that the antenna is operative to propagate signals associated with the second transceiver of the portable electronic device, and a detached configuration, in which the accessory is disengaged from the portable electronic device;

wherein the accessory has a housing defining a cavity, and the cavity is sized and shaped such that, in the attached configuration, the portable electronic device is received at least partially within the cavity;

wherein the accessory is a protective case for the portable electronic device.

10. The system of claim 9, wherein:
the portable electronic device further comprises a battery charging circuit; and
the portable electronic device is operative to energize the battery charging circuit responsive to a charging input being received at the accessory interface.

11. The system of claim 9, wherein:
the accessory interface has a first pin and a second pin; and
in an antenna mode, the first pin is operative to provide a ground and the second pin is operative as an antenna feed for the antenna of the accessory.

12. The system of claim 11, wherein:
the accessory interface has a third pin;
in an antenna mode, the third pin is operative as a second antenna feed; and
in a charging mode, the first pin is operative to provide a ground, the second pin is operative to provide a DC power signal, and the third pin is operative to provide a charger identification signal.

13. The system of claim 9, wherein the antenna is a near field communication (NFC) antenna.

14. The system of claim 9, wherein the accessory is configured as a protective case for the portable electronic device.

15. A method involving a portable electronic device comprising:

configuring an accessory to provide an external antenna for a portable electronic device, the portable electronic device having a first transceiver, a first antenna, and a second transceiver, the first antenna being operative to propagate signals associated with the first transceiver but lacking an antenna operative to propagate signals associated with the second transceiver; and selectively operating the portable electronic device in an antenna mode in which signals associated with the second transceiver are propagated with the antenna of the accessory, the accessory being movable between an attached configuration, in which the accessory interface at least electrically communicates with the device interface such that the antenna is operative to propagate signals associated with the second transceiver of the portable electronic device, and a detached configuration, in which the accessory is disengaged from the portable electronic device;

wherein the accessory has a housing defining a cavity, and the cavity is sized and shaped such that, in the attached configuration, the portable electronic device is received at least partially within the cavity;

wherein the accessory is a protective case for the portable electronic device.

16. The method of claim 15, further comprising selectively operating the portable electronic device in a charging mode, in which a battery of the portable electronic device is charged.

* * * * *